United States Patent
Slupik et al.

(10) Patent No.: US 9,594,361 B2
(45) Date of Patent: Mar. 14, 2017

(54) AUTOMATION AND CONTROL SYSTEM WITH CONTEXT AWARENESS

(71) Applicant: ETC Sp. z o.o., Cracow (PL)

(72) Inventors: Szymon Slupik, Cracow (PL); Maciej Witalinski, Jaworzno (PL)

(73) Assignee: SILVAIR Sp. z o.o. (PL)

( * ) Notice: Subject to any disclaimer, the term of this patent is extended or adjusted under 35 U.S.C. 154(b) by 269 days.

(21) Appl. No.: 14/195,941

(22) Filed: Mar. 4, 2014

(65) Prior Publication Data

US 2015/0105911 A1  Apr. 16, 2015

Related U.S. Application Data

(60) Provisional application No. 61/890,937, filed on Oct. 15, 2013.

(51) Int. Cl.
*G05B 15/02* (2006.01)
*H04L 12/28* (2006.01)
(Continued)

(52) U.S. Cl.
CPC ......... *G05B 15/02* (2013.01); *G06Q 30/0633* (2013.01); *H04L 12/2803* (2013.01);
(Continued)

(58) Field of Classification Search
None
See application file for complete search history.

(56) References Cited

U.S. PATENT DOCUMENTS 5,305,199 A 4/1994 LoBiondo et al.
6,107,918 A * 8/2000 Klein .................. G08B 25/14
340/3.1

(Continued)

FOREIGN PATENT DOCUMENTS

| WO | 0073966 A1 | 12/2000 |
|----|------------|---------|
| WO | 03075243 A1 | 9/2003 |
| WO | 2004029727 A1 | 4/2004 |

OTHER PUBLICATIONS

"Related International Application No. PCT/US2014/060449", "International Search Report and Written Opinion", Dec. 23, 2014, Publisher: PCT ISA/EPO, Published in: EP.

(Continued)

*Primary Examiner* — Qing Wu

(74) *Attorney, Agent, or Firm* — Kaplan Breyer Schwarz & Ottesen, LLP

(57) ABSTRACT

An automation system is disclosed in which a system controller has access to the signals transmitted by each sensor device that is relevant to the environment being controlled. Each sensor device monitors a particular physical condition, senses changes in the condition being monitored, and reports states of the condition, which is made available to the system controller. Meanwhile, the system controller memorizes and maintains the states of various processing events, such as when a sensor device reported a particular state of the condition that the sensor monitors. By considering the information reported by the various and multiple sensor devices, as well as by accounting for the memorized states corresponding to the various events, the system controller is able to generate and continually update a representation of the state of the controlled environment. Having such context awareness enables the design and implementation of sophisticated reasoning logic and conditional logic.

27 Claims, 8 Drawing Sheets

(51) Int. Cl.
  *G08B 21/00* (2006.01)
  *G08B 23/00* (2006.01)
  *G08B 25/00* (2006.01)
  *G06Q 30/06* (2012.01)

(52) U.S. Cl.
  CPC ...... *H04L 12/2816* (2013.01); *H04L 12/2825* (2013.01); *H04L 12/2827* (2013.01); *G05B 2219/25011* (2013.01); *G05B 2219/2614* (2013.01); *G05B 2219/2642* (2013.01); *G08B 21/00* (2013.01); *G08B 23/00* (2013.01); *G08B 25/00* (2013.01); *H04L 2012/285* (2013.01)

(56) References Cited

U.S. PATENT DOCUMENTS

| | | | |
|---|---|---|---|
| 6,772,016 B1* | 8/2004 | Orn | G05B 19/042 340/4.11 |
| 6,909,367 B1 | 6/2005 | Wetmore | |
| 2003/0169171 A1* | 9/2003 | Strubbe | G08B 21/0476 340/573.1 |
| 2004/0189460 A1 | 9/2004 | Heaton et al. | |
| 2010/0063644 A1 | 3/2010 | Kansal et al. | |
| 2011/0106328 A1 | 5/2011 | Zhou et al. | |
| 2012/0150677 A1 | 6/2012 | Shuster | |
| 2012/0265350 A1 | 10/2012 | Ashdown | |
| 2012/0310376 A1 | 12/2012 | Krumm et al. | |
| 2013/0151012 A1 | 6/2013 | Shetty et al. | |
| 2014/0067145 A1 | 3/2014 | Shu | |
| 2014/0266669 A1 | 9/2014 | Fadell et al. | |

OTHER PUBLICATIONS

"Related International Application No. PCT/US2014/060458", "International Search Report and Written Opinion", Dec. 23, 2014, Publisher: PCT ISA/EPO, Published in: EP.
Authorized Officer: Athina Nickitas-Etienne, "International Preliminary Report on Patentability" dated Apr. 19, 2016, issued in related International Patent Application No. PCT/US2014/060449.
Authorized Officer : Alistair Finnie, "International Search Report and Written Opinion" dated Jun. 2, 2015, issued in related International Application No. PCT/US2014/060573.
"Office Action" dated May 5, 2016, issued in related U.S. Appl. No. 14/195,943.
Authorized Officer: Mineko Mohri, "International Preliminary Report on Patentability" dated Apr. 19, 2016, issued in related International Patent Application No. PCT/US2014/060458.
Authorized Officer: Simin Baharlou, "International Preliminary Report on Patentability" dated Apr. 19, 2016, issued in related International Patent Application No. PCT/US2014/060573.
"Final Office Action" dated Jan. 17, 2017 issued in related U.S. Appl. No. 14/195,943.

* cited by examiner

AUTOMATION AND CONTROL SYSTEM WITH CONTEXT AWARENESS

CROSS REFERENCE TO RELATED APPLICATIONS

The underlying concepts, but not necessarily the language, of the following case is incorporated herein by reference:

(1) U.S. Patent Application Ser. No. 61/890,937, filed Oct. 15, 2013.

If there are any contradictions or inconsistencies in language between this application and one or more of the cases that have been incorporated by reference that might affect the interpretation of the claims in this application, the claims in this application should be interpreted to be consistent with the language in this application.

FIELD OF THE INVENTION

The present invention relates to building automation and control in general, and, more particularly, to a centralized controller providing automation and control.

BACKGROUND OF THE INVENTION

Home automation and control refers to the use of computer and information technology to control home systems, such as lighting; heating, ventilation, and air conditioning (HVAC); audio-visual; smoke detection; security; and shading. Using specialized hardware, even household appliances such as coffeemakers can be monitored and controlled automatically. A feature of science fiction for many years, home automation has only recently become practical, both from a technological and cost perspective. This is due to the rapid advancement of information technology.

A home automation and control system (hereinafter "home automation system") in the prior art includes i) sensor devices configured to monitor conditions such as temperature, light, motion detection, and so on, ii) actuator devices to control devices such as motorized valves, switches, and so on, and iii) some control logic. The system also includes a human-machine interface device that enables someone, such as a resident of the home or an occupant of a building, to interact with the system. The interface is typically a specialized, dedicated terminal such as a kinetic device, or an application ("app") running on a smartphone or tablet computer. The various sensor, actor, and interface devices communicate over dedicated wiring, or over a wired network, or wirelessly, using one or more protocols.

The sensor devices that are present in a home automation system typically include one or more of the following:
 i. a motion detection sensor to detect and report the motion and/or presence of humans.
 ii. a temperature sensor to detect and report ambient temperature.
 iii. a light sensor to detect and report light level.
 iv. an air humidity sensor to detect and report humidity level.
 v. a carbon dioxide sensor to detect and report carbon dioxide level.
 vi. a carbon monoxide sensor to detect and report carbon monoxide level.
 vii. a flood (water) sensor to detect and report the presence of water.
 viii. a rain sensor to detect and report whether it is raining outside.

A home automation system having one or more of the aforementioned sensor devices present is able to trigger certain events, such as turning on lights with motion detection, controlling HVAC systems, and so on.

Most home automation systems in the prior art are based on peer-to-peer network architectures that include the sensor and actor devices mentioned earlier. Sensor devices transmit information, such that actor devices can act on the information transmitted. The actor devices act on the information gathered and transmitted by the sensor devices. For example, a sensor detects motion, propagates this information such that a light module receives it, which module turns on electrical current to a light bulb as a result.

There are two primary classes of home automation systems in the prior art. In a first home automation system in the prior art, depicted in FIG. 1A, each sensor device communicates directly with a particular actor or actors. The actor device does not analyze the information it gets, rather it merely responds to it. The entire logic is in the sensor device, in terms of which actor or actors should the sensor device trigger, for how long, on what condition, and so on. A particular example of this class of automation systems is based on Z-Wave™ radio technology, widely used in home installations, in which the sensors devices are thermostats, motion sensors, and wall switches, and the actor devices are typically actuators that affect the flow of electrical current, such as to a light bulb and so on.

In a second home automation system in the prior art, depicted in FIG. 1B, each sensor device broadcasts its signal, but does not know who the recipient of the signal is. Each actor device monitoring for signals that are being broadcast by sensor devices is programmed to listen to specific events from specific sensor devices. Most of the control logic in this class of automation systems is in the actor device, in contrast to the sensor device as in the system depicted in FIG. 1A. A particular example of this class of automation systems is based on EnOcean™ radio technology, in which the wireless sensor is powered by the physical force of pushing a button or by another energy-harvesting approach.

Both of the aforementioned systems are peer-to-peer, in that there is no processing entity between sensor devices and actor devices. All peer-to-peer systems can be equipped with so-called gateways, which are usually equipped with computer network connectivity, such as through wired Ethernet or wireless Wi-Fi, and are generally Internet protocol- (IP-) based. At the same time, a peer-to-peer gateway usually has a radio module dedicated to a particular system, such as a Z-Wave™-to-IP gateway or an EnOcean™-to-IP gateway.

A peer-to-peer gateway in a home automation context realizes two functions. First, it enables IP-connected devices to interact with a radio network; for example, it can use a smartphone to turn on the lights in a Z-Wave™-based system. And second, it enables the management of more than one actor device, in the form of "scenes" (e.g., light scenes, etc.), and coordinates multiple actors operating together, albeit by sending individual commands or multicast commands out to multiple actors.

However, such a peer-to-peer gateway is limited in that it is not an integral part of the communication amongst sensor and actor devices, because it merely monitors the communications traffic and, if necessary, intervenes and sends its own commands.

SUMMARY OF THE INVENTION

The present invention enables the orchestration of multiple actor devices within a home automation system, based in part on signals received from multiple sensor devices co-located with the home. Such orchestration coordinates functions performed by the actor devices within a home, and at a level that is inherently not possible in at least some automation systems in the prior art. The orchestration disclosed herein is made possible by introducing a centralized, system controller that is capable of interacting with multiple sensor and actor devices, and by providing the system controller with context awareness of the operating states of the home.

In the disclosed automation system, the system controller has access to the signals transmitted by each sensor device that is relevant to the environment being controlled. Each sensor device monitors a particular physical condition, senses changes in the condition being monitored, and reports states of the condition, which is made available to the system controller. Meanwhile, the system controller memorizes and maintains the states of various processing events, such as when a sensor device reported a particular state of the condition that the sensor monitors. By considering the information reported by the various and multiple sensor devices, as well as by accounting for the memorized states corresponding to the various events, the system controller is able to generate and continually update a representation of the state of the controlled home environment, thereby becoming and remaining context aware. Having such context awareness enables the design and implementation of sophisticated reasoning logic and conditional logic.

The following example demonstrates the utility and advantage of having such logic present in a home automation system. As part of the example, a home is equipped with windows that can be opened and closed by using a remote control, which is a feature that is already exists in the prior art. The home is further equipped with a rain sensor accessory that closes the window when it rains, but it never opens on its own; this rain sensor also exists in the prior art. The feature of never opening on its own exists because the resident of the home might, at some point, leave the home; for security reasons, the resident would not want the window to re-open merely based on whether the rain sensor device senses that the rain has stopped.

Continuing with the example, in order to make an intelligent decision to automatically open a window, one needs to know about the state of the home. The state of the home might be based on knowing if people are in the home, if it is not too cold outside, if a home alarm is not armed, if the window was open previously before started raining, and so on. When a state representation of the home can be generated and updated when necessary, it is then possible to command a window motor to open its window only when list of specific conditions is met. To make such conditional behavior possible, the system controller of the illustrative embodiment is provided, which receives information from multiple sensor devices, including the rain sensor and motion sensors, and controls the actions of multiple actor devices, including the window motor.

By having a context awareness that includes the current up-to-date state of the controlled environment, the system controller in the foregoing example can execute a variety of algorithms to perform various functions. For example, the system controller can command a window motor actor device to open a window only if:
  i. the rain was short, as sensed by a rain sensor in combination with maintaining a memorized state of whether rain has been sensed by the sensor within the past 10 minutes; and
  ii. it is still warm outside, as sensed by an outdoor temperature sensor; and
  iii. people are still inside the house, as sensed by motion detection sensors.

At a casual glance, the system controller of the illustrative embodiment might appear to be similar to a peer-to-peer gateway in the prior art. However, the system controller functions fundamentally differently than such a gateway. The system controller is an intermediary in a sensor-controller-actor system, so there is no need for direct communication between a sensor device and an actor device (although such communication is not precluded) and, in fact, the controller processes information based on programmed logic and decides how to act on this information.

In accordance with an illustrative embodiment, the disclosed automation system is an automation system in a home. As those who are skilled in the art will appreciate after reading this specification, however, the disclosed automation system can be applied to any type of building, including the environment surrounding the building, or to any environment in which automated control can be applied.

An illustrative method for controlling automation of a building comprises: receiving, by a server computer, one or more input signal values from each of a plurality of sensor devices associated with the building, including a surrounding environment thereof, wherein the plurality of sensor devices comprises at least a first sensor device and a second sensor device, and wherein the received input signal values comprise: a) a first input signal value received from the first sensor device, wherein the first input signal value of the first sensor device is of a first plurality of possible input signal values, and b) a first input signal value received from the second sensor device, wherein the first input signal value of the second sensor device is of a second plurality of possible input signal values; generating, by the server computer: a): a first decision, of a plurality of decisions, wherein the first decision is based on: i) the first input signal value from the first sensor device, ii) the first input signal value from the second sensor device, and iii) a memorized state of at least one processing event, and b) a first message designated for a first actor device associated with the building, wherein the first message is based on the first decision; and transmitting, by the server computer, the first message to the first actor device.

An illustrative building automation controller comprises: a receiver configured to receive one or more input signal values from each of a plurality of sensor devices associated with a building, including a surrounding environment thereof, wherein the plurality of sensor devices comprises at least a first sensor device and a second sensor device, and wherein the received input signal values comprise: a) a first input signal value received from the first sensor device, wherein the first input signal value of the first sensor device is of a first plurality of possible input signal values, and b) a first input signal value received from the second sensor device, wherein the first input signal value of the second sensor device is of a second plurality of possible input signal values; a processor configured to generate: a): a first decision, of a plurality of decisions, wherein the first decision is based on: i) the first input signal value from the first sensor device, ii) the first input signal value from the second sensor device, and iii) a memorized state of at least one processing event, and b) a first message designated for a first actor device associated with the building, wherein the first message is based on the first decision; and a transmitter configured to transmit the first message to the first actor device.

An illustrative building automation system comprises: a first sensor device that is configured to monitor a first physical condition and to transmit wirelessly input signal values that are based on the first physical condition being monitored, wherein the first sensor device is associated with a building, including a surrounding environment thereof; and a controller that is configured: a) to receive wirelessly the input signal values from the first sensor device, wherein the received input signal values comprise a input signal value received from the first sensor device, wherein the input signal value of the first sensor device is of a plurality of possible input signal values, b) to generate a first decision, of a plurality of decisions, wherein the first decision is based on both the input signal value from the first sensor device and a memorized state of at least one processing event, c) to transmit a first message, wherein the first message is based on the first decision.

An illustrative non-transitory computer-accessible medium comprising program instructions is disclosed, wherein the program instructions are computer-executable to: receive one or more input signal values from each of a plurality of sensor devices associated with a building, including a surrounding environment thereof, wherein the plurality of sensor devices comprises at least a first sensor device and a second sensor device, and wherein the received input signal values comprise: a) a first input signal value received from the first sensor device, wherein the first input signal value of the first sensor device is of a first plurality of possible input signal values, and b) a first input signal value received from the second sensor device, wherein the first input signal value of the second sensor device is of a second plurality of possible input signal values; 2) generate: a): a first decision, of a plurality of decisions, wherein the first decision is based on: i) the first input signal value from the first sensor device, ii) the first input signal value from the second sensor device, and iii) a memorized state of at least one processing event, and b) a first message designated for a first actor device associated with the building, wherein the first message is based on the first decision; and 3) transmit the first message to the first actor device.

DETAILED DESCRIPTION

Figure 1B:
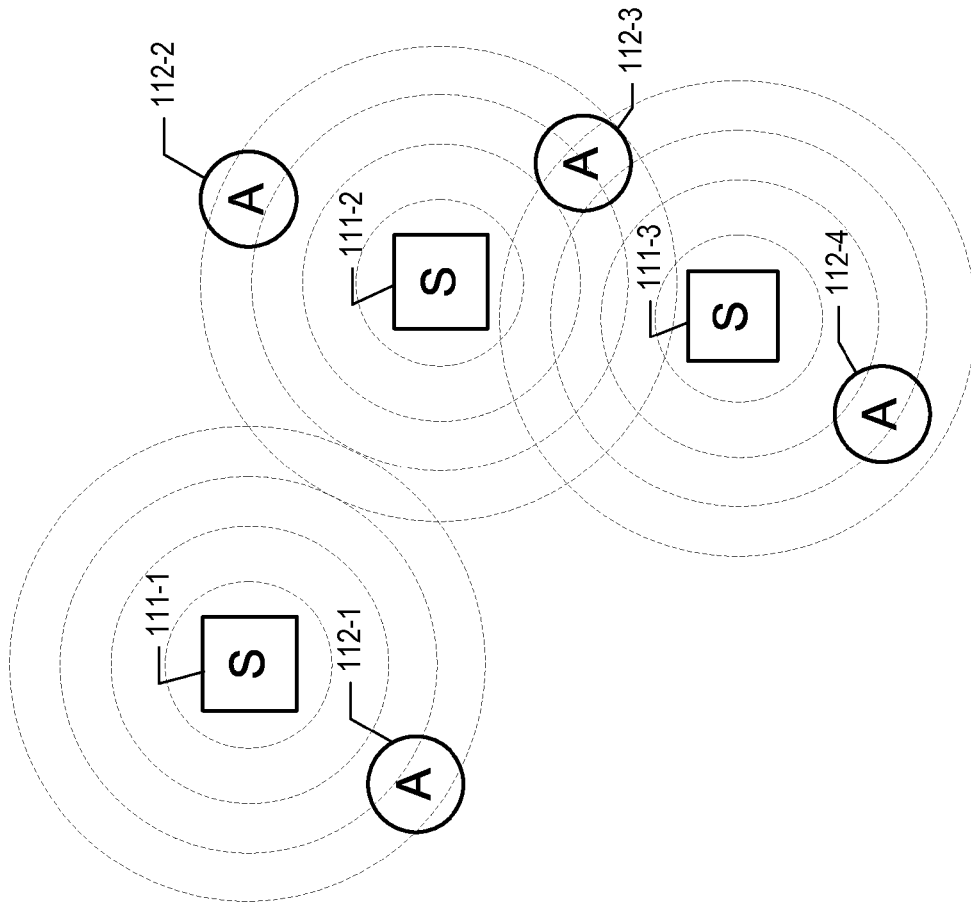
FIGS. 1A and 1B depict home automation systems in the prior art.
Figure 1A:
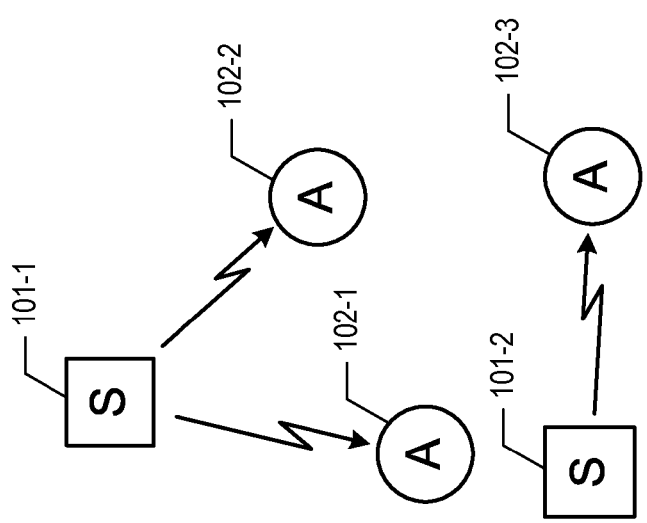
Figure 2:
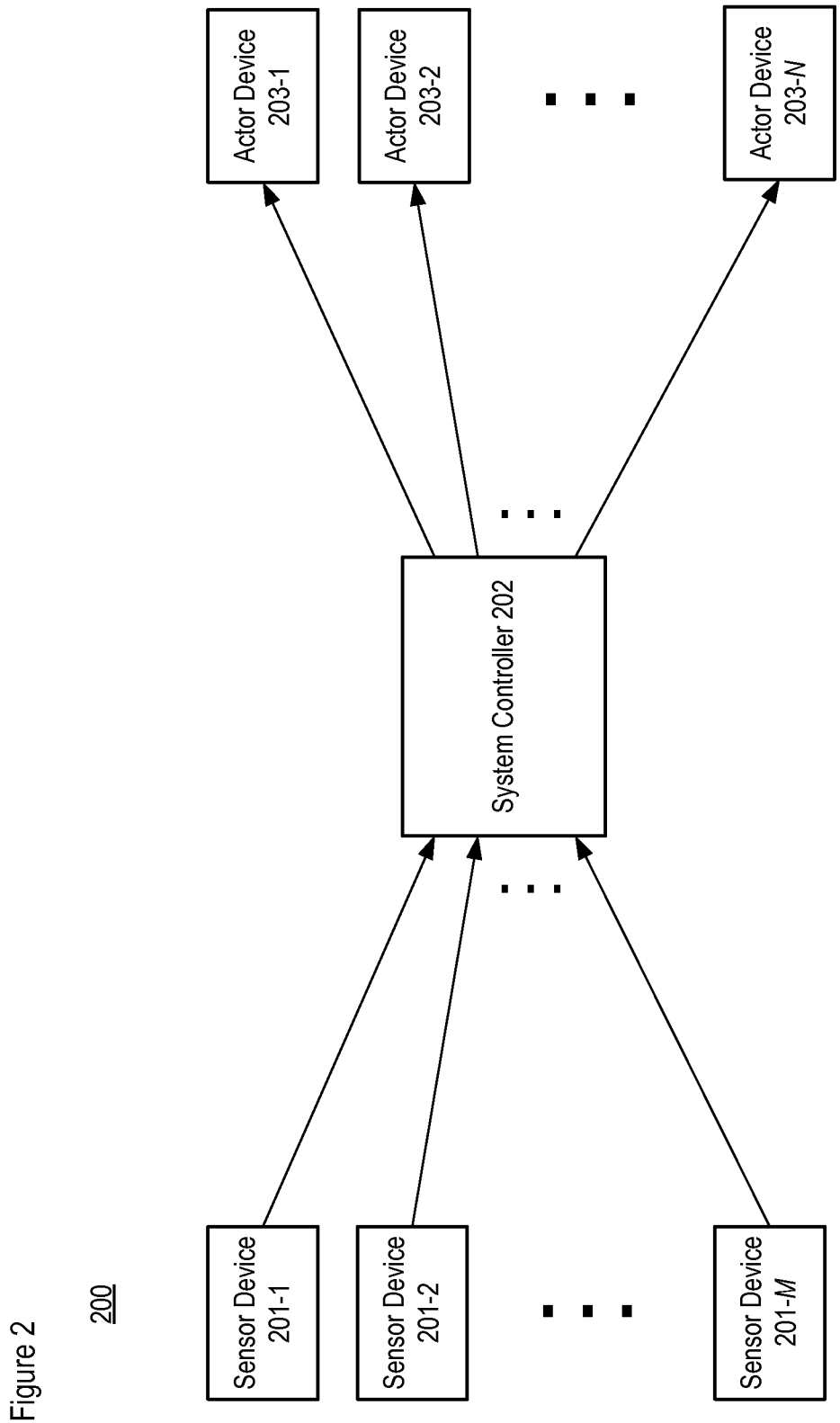
FIG. 2 depicts automation system 200, in accordance with an illustrative embodiment of the present invention.

FIG. 2 depicts automation system 200, in accordance with an illustrative embodiment of the present invention. System 200 comprises: sensor devices 201-1 through 201-M, wherein M is a positive integer; system controller 202; and actor devices 203-1 through 203-N, wherein N is a positive integer. The aforementioned elements are interconnected as shown and, as depicted, are physically distinct devices with respect to one another.

In accordance with an illustrative embodiment, automation system 200 is an automation system in the home. As those who are skilled in the art will appreciate after reading this specification, however, automation system 200 can be applied to any type of building, including the environment surrounding the building, or to any environment in which automated control can be applied.

Sensor device 201-$m$, wherein m has a value between 1 and M, inclusive, is an apparatus that comprises memory, processing components, and communication components, and is configured to transmit signals providing sensor-related information, as discussed in detail below. In accordance with an illustrative embodiment, each sensor device 201-$m$ comprises one or more sensor components, wherein each sensor gathers information about the environment that is accessible by the sensor device. At least some of the sensor devices are co-located with building 400, including its surrounding environment, while at least some of the sensor devices might be merely relevant to building 400.

Each sensor device is configured to monitor a particular physical condition in well-known fashion. A sensor senses a change in the condition being monitored and is configured to report a state of the condition by providing input signals (i.e., from system controller 202's perspective), wherein the values of the input signals are representative of the states being reported. A given sensor device 201-$m$ can report discrete input signal values and/or a continuum of states and can report states at particular times and/or continuously. For example and without limitation, sensor device 201-$m$ can comprise one or more of the following sensor components:

i. a motion detection sensor (e.g., a Passive InfraRed [PIR] element, etc.) to detect and report the motion and/or presence of humans. For example, the reported state might be "motion detected" or "motion not detected".

ii. a temperature sensor to detect and report ambient temperature. For example, the reported state might be a temperature value.

iii. a light (luminescence) sensor to detect and report light level (e.g., ambient level, etc.). For example, the reported state might be a light-level value.

iv. a touch sensor to wake up and/or trigger other sensors, particularly those with a higher power draw (e.g., accelerometer, gyroscope, etc.). This sensor can report a touch event to trigger various actions when touched. This sensor can also be used as a protection against theft of a sensor device; for example, the system may sound an alarm when sensor device 201-$m$ is touched or moved. For example, the reported state might be "contact detected" or "contact not detected".

v. an accelerometer (e.g., single-axis, multi-axis, etc.) sensor to detect and report position/orientation (e.g., incline, etc.) and other motion-related events (e.g., taps, bumps, etc.). For example, the reported state might be an orientational value and/or a positional value.

vi. a gyroscope (e.g., single-axis, multi-axis, etc.) to detect and report motion (e.g., shifts, turns, etc.). For example, the reported state might be a translational motion value and/or a rotational motion value.

vii. an air humidity sensor to detect and report humidity level, for the purpose of controlling A/C, fans, and so on. For example, the reported state might be a humidity value.

viii. a carbon dioxide sensor to detect and report carbon dioxide level, for the purpose of controlling A/C, ventilation, and so on. For example, the reported state might be a carbon dioxide level value.

ix. a carbon monoxide sensor to detect and report carbon monoxide level, for the purpose of providing a security/safety alarm function. For example, the reported state might be a carbon monoxide level value.

x. a (natural) gas sensor to detect and report gas, for the purpose of providing a security/safety alarm function. For example, the reported state might be a gas level value.

xi. a flood (water) sensor to detect and report the presence of water, implemented with exposed contact electrodes, for example. For example, the reported state might be "water detected" or "water not detected".

xii. a rain sensor to detect and report whether it is raining outside. For example, the report state might be "raining" or "not raining".

xiii. a radio beacon receiver. In some embodiments of the present invention, device 201-$m$ can be moved around; accordingly, device 201-$m$ is configured to be able to determine and report its location (e.g., relative location, absolute location, etc.) via receiving one or more radiolocation beacons. In some embodiments, the device can detect the proximity of other radio location beacon sources such as smart buttons, key fobs, mobile stations emitting beacon signals, and so on.

xiv. a real-time clock that can be used in conjunction with geolocation information to compute the position of the Sun, making device 201-$m$ aware of the outside light level (e.g., day versus night, etc.), which the device can report on.

xv. an electronic compass. For example, the reported state might be a static "heading" of the sensor device.

xvi. a sensor that is worn or carried by a person (e.g., a Jawbone Up24™ bracelet, etc.), which detects and reports a condition of the person or of the person's immediate environment. An advantage of using such a sensor associated with a person is that can provide a more direct indication of a human-related activity occurring within a building than other sensors associated with the building. Moreover, a sensor associated with a particular person is able to monitor the pace of the particular individual.

xvii. virtual "sensor" such as, but not limited to, a web-based service that monitors and reports on one or more environmental conditions, including reports comprising predictions of the future states of one or more of the conditions being monitored. For example, a temperature "sensor" can be a weather-forecasting web service that provides a forecast of a future temperature, future air quality, future cloud cover, future precipitation, and so on.

As those who are skilled in the art will appreciate, after reading this disclosure, sensor device 201-$m$ can provide a different function than those described above. Furthermore, sensor device 201-$m$ can comprise any combination of and any number of sensor components, possibly including some or all of the sensor components listed above.

System controller 202 is an apparatus that comprises memory, processing components, and communication components. Controller 202 is illustratively a server computer.

Controller 202 executes and coordinates the actions to be taken by one or more actor devices 203-1 through 203-N, based on i) the input signals received from one or more sensor devices 201-1 through 201-M and ii) one or more memorized states of at least one processing event. In particular, controller 202 receives information about the states of sensor devices 201-1 through 201-M and, in some embodiments, of actor devices 203-1 through 203-N, maintains in memory the states of various processing events (e.g., predetermined sequences of various input signal values, the time since a last instance of a predetermined input signal value was received, other events that reflect changes in states reported by the sensor devices, etc.). System controller 202 is described in more detail below and in FIG. 3.

In accordance with the illustrative embodiment, system controller 202 telecommunicates wirelessly with the other depicted devices (i.e., sensor devices and actor devices). It will clear to those skilled in the art, however, after reading the present disclosure, how to make use and use various embodiments of the present invention in which controller 202 telecommunicates via physical media (e.g., cable, wire, etc.) to one or more of the other devices, either in addition to or instead of wirelessly.

In some alternative embodiments of the present invention, system controller 202 might not be a physically distinct device per se, instead its functionality might be embodied in one or more of the sensor devices and/or actor devices, or might be cloud-based outside of the building being controlled.

Actor device 203-$n$, wherein n is equal to 1 through N, inclusive, is an apparatus that comprises memory, processing components, and communication components, and is capable of doing something in the course of being affected by signals originating from one or more sensor devices 201-1 through 201-M and processed by system controller 202, as discussed in detail below. In accordance with an illustrative embodiment, each actor device 203-$n$ takes decisions that are based on signals from one or more sensor devices, as processed by system controller 202, and performs appropriate actions upon the actor's environment. Each actor device acts upon its environment in well-known fashion. In some embodiments, an actor device is or comprises an actuator, as is known in the art.

Actor device 203-$n$ is configured to receive, transmit, process, and/or relay signals conveying data, as well as being configured to affect a condition, physical or otherwise, in its environment. For example and without limitation, the condition being affected can be:

i. lighting, which can be adjusted (e.g., turning on or off, changing color or mood, displaying a picture or pattern, etc.).

ii. sound, which can be adjusted (e.g., increasing or decreasing volume, changing playlist or mood, turning on/off, selecting signal source, etc.).

iii. room climate, which can be controlled (e.g., increasing or decreasing temperature, humidity, air fragrance, etc.).

iv. an alert, which can be generated (e.g., of an email, of an SMS message, etc.).

v. monitoring by a camera, which can be panned or tilted.

vi. home entertainment/home cinema settings (e.g., selecting one or more of signal source, streaming application, multimedia to play, audio language, subtitles, chapter, play/pause/stop, rewind/fast forward, etc.).

vii. connected/smart TV features (e.g., selecting application to be launched, navigating through on-screen menus, etc.).

viii. virtual keyboard—navigation on virtual keyboard displayed by other device (e.g., TV, set-top box, etc.).

ix. control of shades/window coverings.

x. access control (e.g., unlocking/locking doors, opening/shutting doors, authorizing access to selected rooms or zones, etc.).

As those who are skilled in the art will appreciate, after reading this disclosure, actor device 203-$n$ can be in a variety of forms, such as a light bulb as part of a lighting system, a media player as part of an audio/video system, a heater as part of an environment control system, an outgoing-email server as part of a messaging system, an actor in a water sprinkler system, a robot or robotic arm, a pan/tilt camera, a switch, a motor, a servo mechanism, and so on.

As those who are skilled in the art will appreciate, after reading this specification, actor device 203-$n$ may or may not have additional functions and components, such as i) a sensing component (e.g., a washing machine that can be remotely controlled and reports its state and parameters, etc.), and/or ii) a controlling component (e.g. a light bulb unit having a controller is directly controlled from sensor device, etc.).

Figure 3:
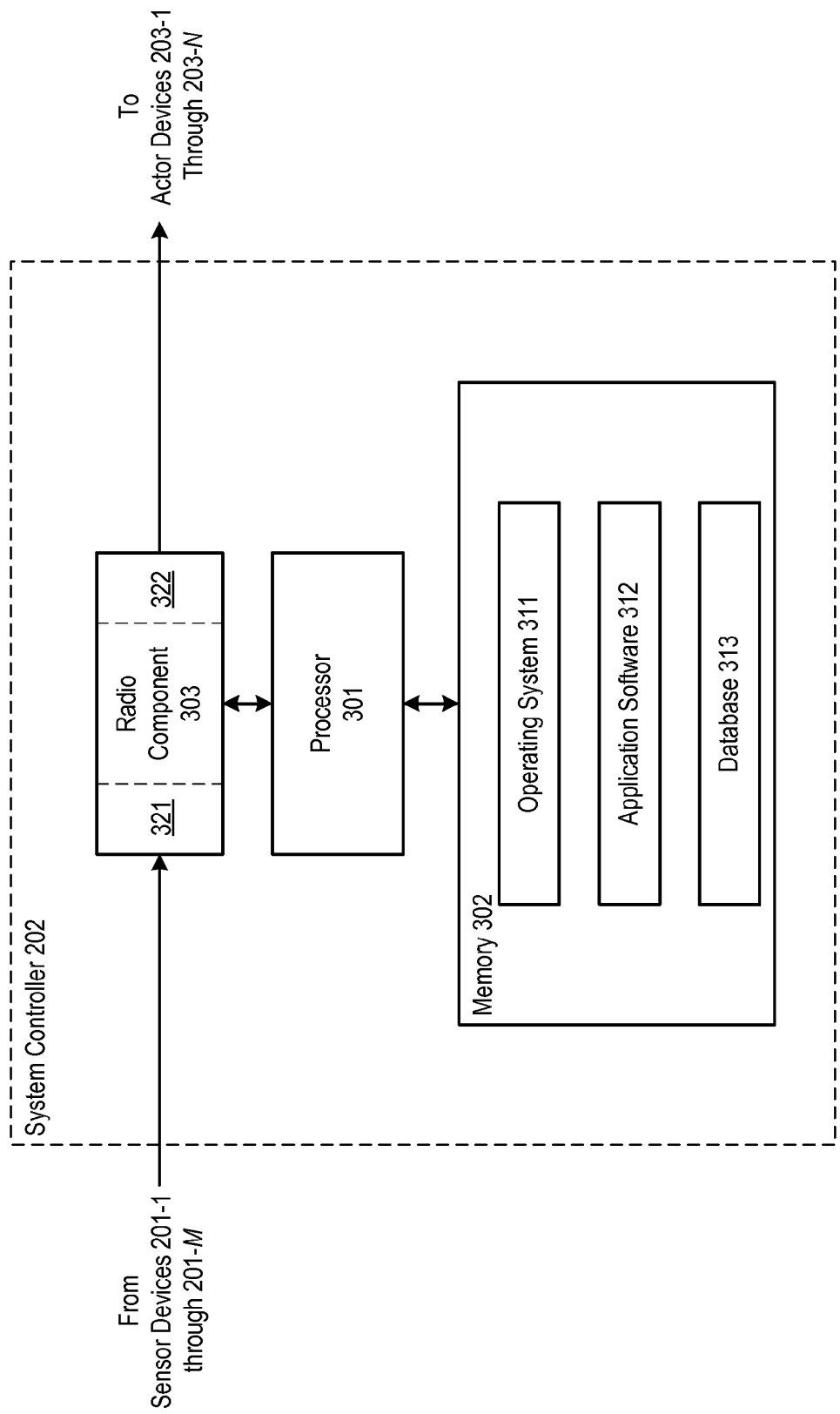
FIG. 3 depicts the salient components of system controller 202 according to an illustrative embodiment of the present invention.

FIG. 3 depicts the salient components of system controller 202 according to an illustrative embodiment of the present invention. According to the illustrative embodiment, system controller 202 is based on a data-processing apparatus whose hardware platform comprises: processor 301, memory 302, and radio component 303.

Processor 301 is a processing device, such as a microprocessor that is well known in the art. In accordance with an illustrative embodiment, processor 301 comprises a Freescale iMX28 SoC (ARM-based) processor; in some alternative embodiments, however, processor 301 comprises a different type of processor. Processor 301 is configured such that, when operating in conjunction with the other components of system controller 202, processor 301 executes software, processes data, and telecommunicates according to the operations described herein.

Processor 301 is configured to handle both:

i. combinatorial logic, whose output is a function of only the present input (e.g., input signal values from sensor devices 201-1 through 201-M, etc.), and ii. sequential logic, whose output depends also on the past history of the inputs.

In handling sequential logic, processor 301 memorizes (e.g., stores into memory 302, etc.) certain events, states, results, and so on, for future use. In doing so, processor 301 maintains one or more memorized states of processing events, including the points in time when they occurred. In the sequential logic performed by processor 301, the internal, memorized state information may be processed and changed. For example, a motion sensor device has been tripped, resulting in controller 202 turning on the lights in the kitchen for five minutes. Because processor 301 executes a synchronous logic that is clocked at 50 Hz, five minutes equates to 50×60×5 clock ticks, or 15000 ticks. A counter is set up at 15000, and at every tick cycle the counter is decremented by 1. When the counter reaches zero, controller 202 turn the lights off. Then, if the motion sensor device is tripped again during the countdown time (e.g., a person is still in the kitchen and moves), the counter is reset to 15000 and continues to be decremented at every clock cycle.

Because processor 301 handles both kinds of logic, the decision logic of the illustrative embodiment is based not only on real-time input information from sensors (i.e., related to combinational logic) but also on some memorized state of the logic (i.e., related to sequential logic). The memorized state comprises information on processing events that occurred in the past and, at least for some events, the times at which they occurred.

The scenario of a double-click, triple-click, or long-click sensor detection is also handled by system controller 202. A pushbutton sensor device generates and reports only the two basic states of "pressed" and "released." It is up to the sequential logic of processor 301 to record these received states and their times of occurrences as processing events, and decide whether a particular sequence qualifies as a double click. For example, a double-click sequence can be predetermined as comprising a press-release-press-release cycle occurring within two seconds. In order to determine whether a double click has occurred, processor 301 needs not only to receive the current input signal value (i.e., signifying "pressed"), but must also consider the memorized state of whether there have been any past input signal values (i.e., signifying "presses" or "releases") received within the past two seconds, or whatever the predetermined time interval is.

The foregoing example applies to other combinations of input signal values and memorized states of processing events, as those who are skilled in the art will appreciate after reading this specification. As another example of its sequential logic, processor 301 tracks which of two motion-sensor detectors in a hallway has been tripped most recently, in order to infer a direction of movement through the hallway.

Memory 302 is non-transitory and non-volatile computer storage memory technology that is well known in the art (e.g., flash memory, etc.). Memory 302 is configured to store operating system 311, application software 312, and database 313. The operating system is a collection of software that manages, in well-known fashion, controller 202's hardware resources and provides common services for computer programs, such as those that constitute the application software. In accordance with an illustrative embodiment, operating system 311 is Linux-based; in some alternative embodiments, however, operating system 311 is based on a different platform. The application software that is executed by processor 301 according to the illustrative embodiment enables controller 202 to perform the functions disclosed herein. Database 313 comprises information about each sensor device, each actor device, and their relationships with each other; environmental information; values of one or more building states; values of one or more activities occurring at a building; and so on.

It will be clear to those having ordinary skill in the art how to make and use alternative embodiments that comprise more than one memory 302; or comprise subdivided segments of memory 302; or comprise a plurality of memory technologies that collectively store the operating system, application software, and database.

Radio component 303 is configured to enable multi-sensor device 201-$m$ to telecommunicate with other devices and systems by receiving signals therefrom and/or transmitting signals thereto, in well-known fashion, by using receiver part 321 and transmitter part 322, respectively. For example, radio component 303 communicates with each sensor device 201-$m$ and each actor device 203-$n$. Radio component 303 communicates via one or more radio telecommunications protocols such as, but not limited to, Z-Wave, ZigBee, Bluetooth, Wi-Fi, and so on. In some embodiments, radio component 303 comprises a built-in Bluetooth Smart radio transceiver.

Receiver part 321 is a component that enables system controller 202 to telecommunicate with other components and systems by receiving signals that convey information therefrom. It will be clear to those having ordinary skill in the art how to make and use alternative embodiments that comprise more than one receiver part 321.

Transmitter part 322 is a component that enables system controller 202 to telecommunicate with other components and systems by transmitting signals that convey information thereto. It will be clear to those having ordinary skill in the art how to make and use alternative embodiments that comprise more than one transmitter part 322.

In accordance with the illustrative embodiment, system controller 202 uses radio component 303 in order to telecommunicate wirelessly with external devices. It will clear to those skilled in the art, however, after reading the present disclosure, how to make use and use various embodiments of the present invention in which system controller 202 communicates via a wired protocol (e.g., X10, KNX, etc.) over physical media (e.g., cable, wire, etc.) with one or more external devices, either in addition to or instead of the wireless capability provided by radio component 303.

It will be clear to those skilled in the art, after reading the present disclosure, that in some alternative embodiments the hardware platform of system controller 202 can be embodied as a multi-processor platform, as a sub-component of a larger computing platform, as a virtual computing element, or in some other computing environment—all within the scope of the present invention. It will be clear to those skilled in the art, after reading the present disclosure, how to make and use the hardware platform for system controller 202.

Figure 4:
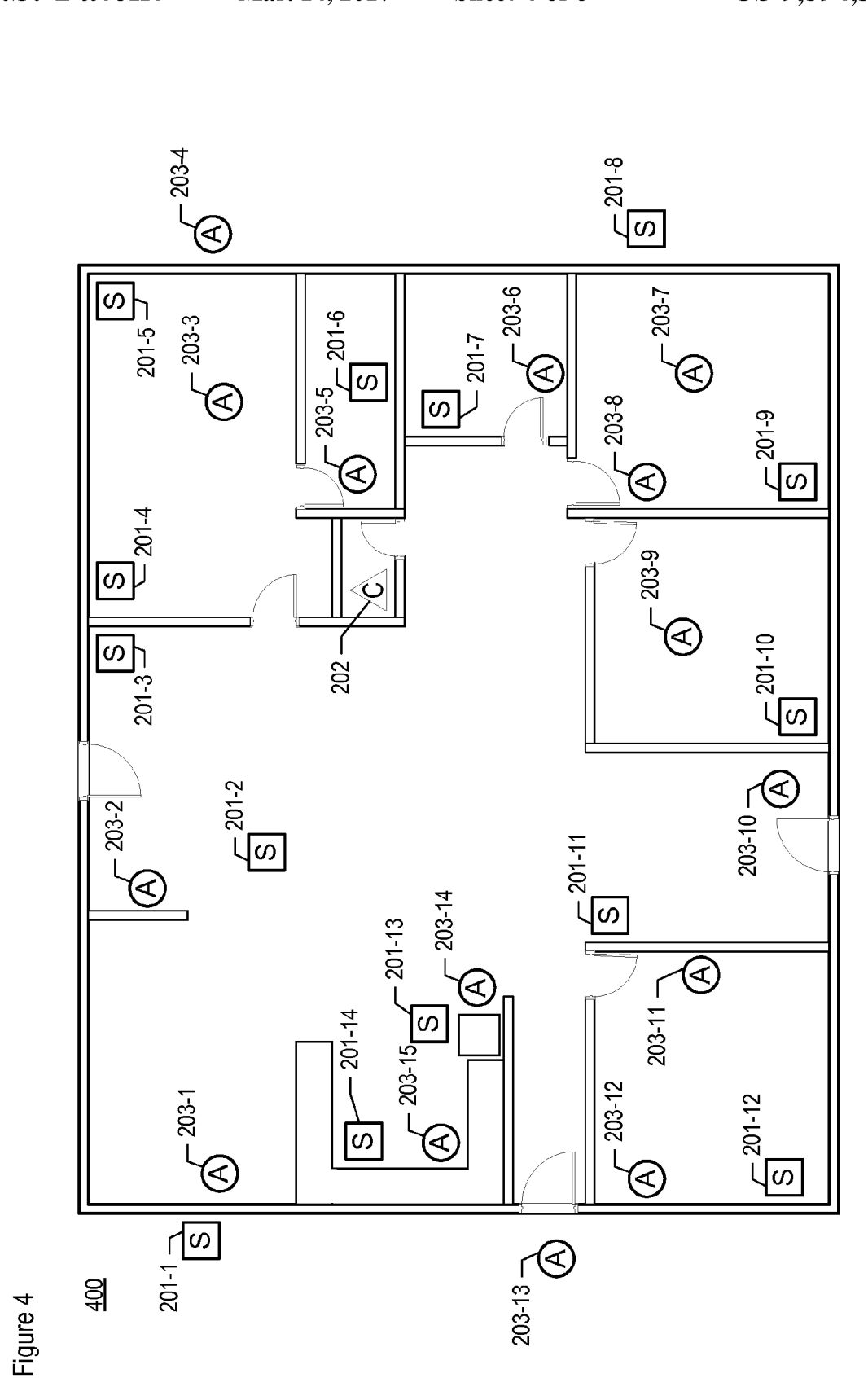
FIG. 4 depicts an illustrative floor plan of building 400 and a surrounding environment of the building.

FIG. 4 depicts an illustrative floor plan of building 400 and a surrounding environment of the building. Building 400 is equipped with sensor devices 201-1 through 201-13, system controller 202, and actor devices 203-1 through 203-14. For the purpose of this specification, and the appended claims, the term "building," and its infected forms, is defined as a structure with a roof and walls, such as a house, a school, a store, a factory, an apartment complex, an office complex, a corporate office, and so on—for example and without limitation. A building might comprise one or more "dwellings," such as a house, an apartment, or other place of residence. Furthermore, the environment surrounding the building might include a strip of land running adjacent to the building, a yard or other property within which the building is situated, a street, a municipal area, and so on—for example and without limitation.

As those who are skilled in the art will appreciate, after reading this specification, building 400 can comprise different numbers of sensor devices, system controllers, and/or actor devices than those depicted. Furthermore, building 400 as depicted is a house, but as those who are skilled in the art will appreciate, after reading this specification, building 400 can be a different type of structure with a roof and walls, or can instead be a defined area that comprises multiple sub-areas, wherein at least a portion of the area and/or sub-areas is defined by something other than a roof and/or walls.

At least some of the rooms or areas within building 400 comprise one or more sensor devices 201 and/or one or more actor devices 203. The sensor devices and actor devices provide at least some of the functionality described earlier (e.g., motion-detection, lighting, etc.). As can be seen in FIG. 4, the sensor devices are actor devices are situated throughout building 400 and the surrounding environment. As a result, and in accordance with an illustrative embodiment of the present invention, system controller 202 is capable of taking advantage of various combinations of sensor devices and actor devices such as the following, either individually or in any combination, and without limitation:

i. one or more sensor devices from a first area (e.g., outside, master bathroom, kitchen, etc.) or set of areas affecting one or more actor devices in a second area (e.g., kitchen, master bedroom, front hallway, etc.) or set of areas.

ii. one or more sensor devices of a first type (e.g., rain sensor, motion detector, light detector, etc.) or set of types affecting one or more actor devices of a second type (e.g., security alarm, temperature regulator (HVAC), light bulb, etc.) or set of types.

iii. a first number of sensor devices affecting a second number of actor devices.

iv. a single sensor device (e.g., rain sensor, motion detector, light detector, etc.) being used to generate a first decision of type of decision, infer a first activity, affect a first type of actor device, and/or affect a first number of actor devices, while multiple sensor devices (e.g., rain sensors, a rain sensor and a motion detector, etc.) are used to generate a second decision or type of decision, infer a second activity, affect a second type of actor device, and/or affect a second number of actor devices. The particular set of sensor devices that is used (e.g., set of a single sensor, set of multiple sensors, set of a particular combination of sensors, etc.) can be optionally based on a representation of a state of building 400 and/or on one or more environmental factors.

As those who are skilled in the art will appreciate, after reading this specification, system controller 202 does not have to be physically present within the building. The functions performed by illustrative controller 202 can, in fact, be executed anywhere. For example and without limitation, the functions can be executed in "the Cloud," in which case the sensor and actor devices connect to the Cloud, either directly or via a home-to-cloud gateway. In other words, system controller 202 can be virtualized or located somewhere else other than in building 400.

Figure 5:
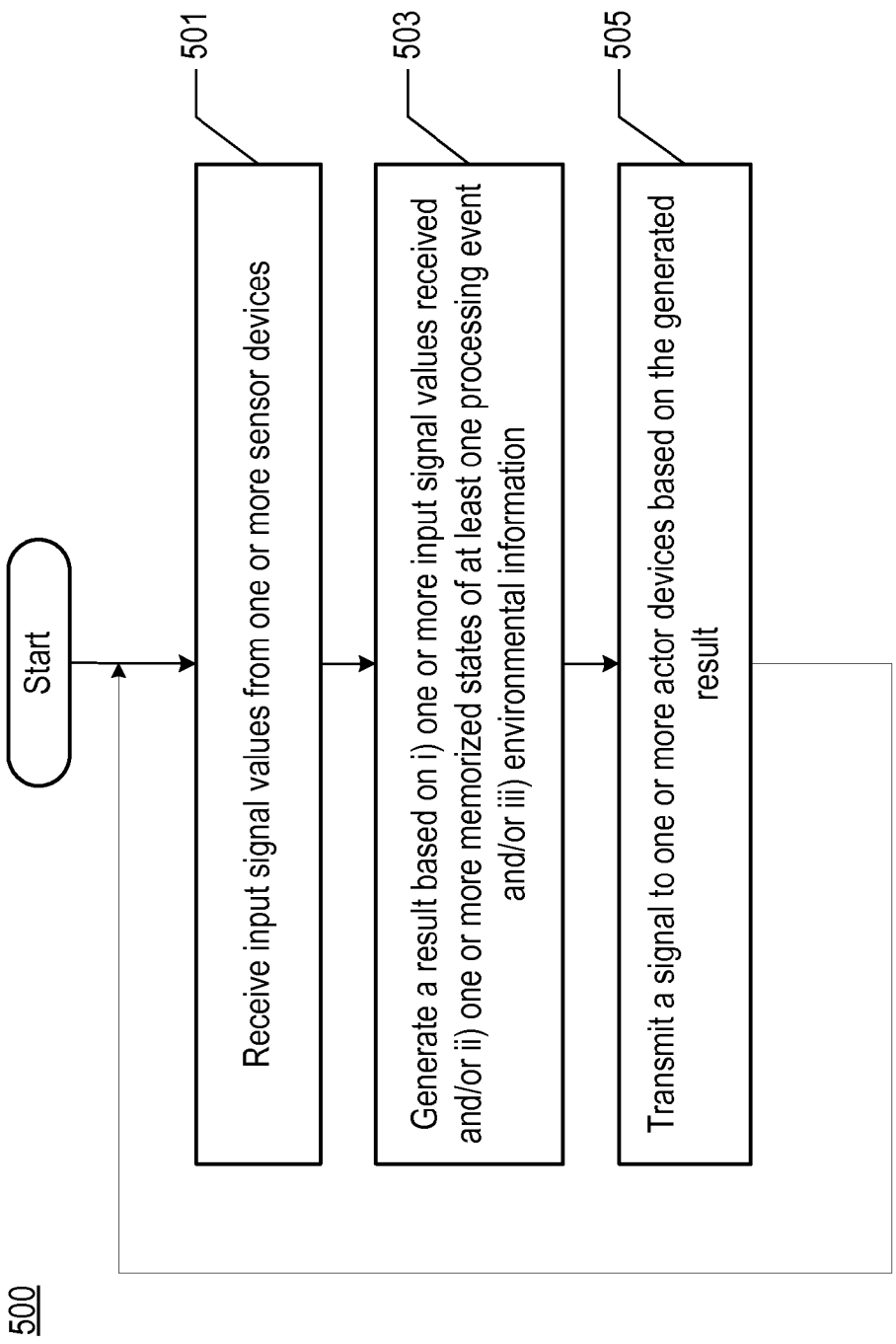
FIG. 5 depicts some salient operations of method 500 according to an illustrative embodiment of the present invention.

FIG. 5 depicts some salient operations of method 500 according to an illustrative embodiment of the present invention. System controller 202 is the entity within illustrative home automation system 200 that executes and coordinates the operations of method 500. For the pedagogical purposes, system controller 202 operates within building 400, as well as sensor devices 201-1 through 201-M and actor devices 203-1 through 203-N. As those who are skilled in the art will appreciate however, after reading this specification, the operations described herein can be applied to a setting different than that of building 400.

In regard to method 500, it will be clear to those having ordinary skill in the art, after reading the present disclosure, how to make and use alternative embodiments of method 500 wherein the recited operations and sub-operations are differently sequenced, grouped, or sub-divided—all within the scope of the present invention. It will be further clear to those skilled in the art, after reading the present disclosure, how to make and use alternative embodiments of method 500 wherein some of the recited operations and sub-operations are optional, are omitted, or are executed by other elements and/or systems.

At operation 501, system controller 202 receives signals having input signal values, from one or more sensor devices 201-1 through 201-M. Operation 501 is described below and in FIG. 6.

At operation 503, system controller 202 generates one or more results based on i) the one or more signals received at operation 501 and/or ii) one or more memorized states of at least one processing event and/or iii) environmental information. Operation 503 is described below and in FIG. 7.

At operation 505, system controller 202 transmits one or more signals to one or more actor devices 203-1 through 203-N, based at least in part on at least some of the results generated at operation 503. Operation 505 is described below and in FIG. 8.

Figure 6:
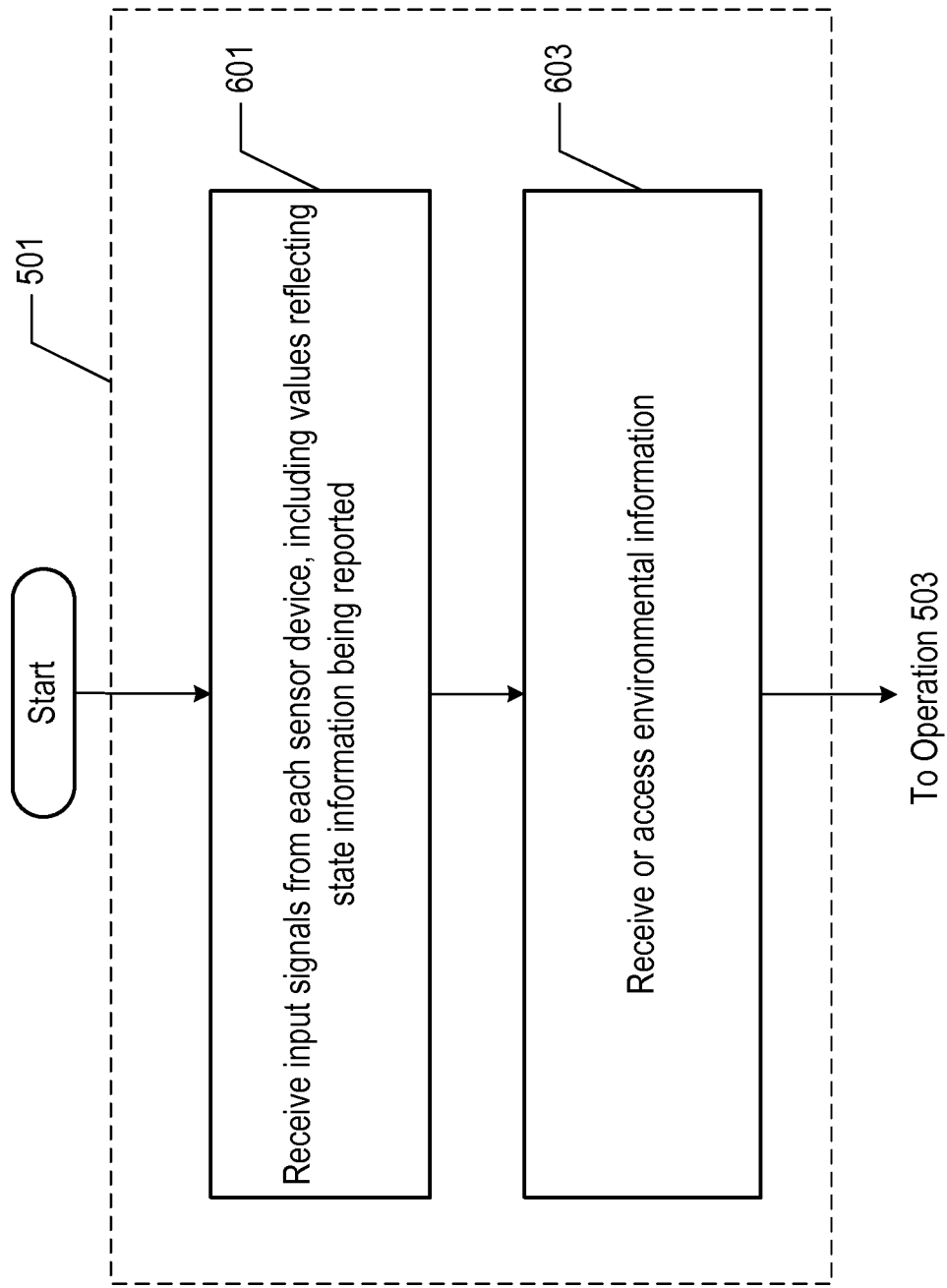
FIG. 6 depicts some salient sub-operations within operation 501.

FIG. 6 depicts some salient sub-operations within operation 501. At operation 601, controller 202 receives signals from each of sensor devices 201-1 through 201-M associated with building 400. In some embodiments of the present invention, controller 202 receives, from the sensor devices, the state or states being reported by each of the sensor devices and conveyed by values of input signals received by controller 202. Each input signal value received from each sensor device is of plurality of possible input signal values for that device. The plurality of input signal values for a first sensor device and the plurality of input signal values for a second sensor device can be independent of each other, dependent on each other, one dependent on the other, mutually exclusive, overlapping, identical, or of any other type of relationship.

At operation 603, system controller 202 receives or accesses environmental information, as described below and in FIG. 7.

Figure 7:
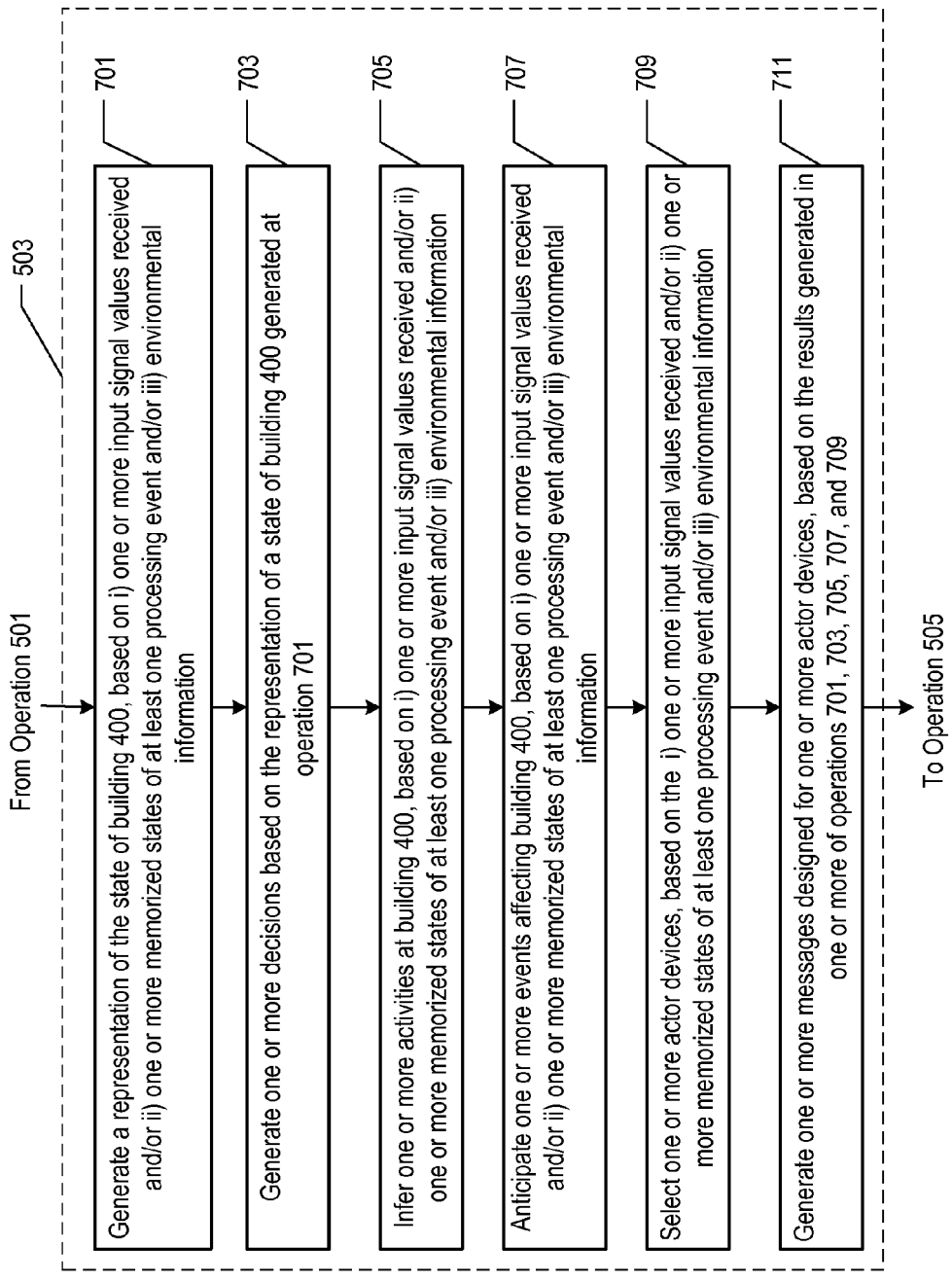
FIG. 7 depicts some salient sub-operations within operation 503.

FIG. 7 depicts some salient sub-operations within operation 503. As part of the operations of FIG. 7, system controller 202 generates one or more results based on one or more of the following, in any combination:

i. the one or more input signal values received at operation 501.
ii. one or more memorized states of at least one processing event. The concept of a memorized state of a processing event was discussed above and in regard to processor 301 in FIG. 3.
iii. environmental information.

At operation 701, using one or both of i) the values of the input signals received from sensor devices 201-1 through 201-M and ii) the memorized states of one or more processing events, controller 202 generates a representation (e.g., a "map", etc.) of the state of building 400. The state of building 400 is characterized by anything that is directly detected (e.g., sensed, etc.) by sensor devices 201-1 through 201-M associated with the building, in combination with the memorized states of one or more processing events. The state of the building can be characterized by one or more detections made by each individual device, or by a combination of devices, or both, taking into account the memorized states of one or more processing events. The representation includes information such as, and without limitation, one or more of the following:

i. whether people are present in the building (e.g., sensors detecting motion within the past 30 minutes during the waking hours, infrared sensors detecting certain heat signatures during the nighttime hours, etc.);
ii. whether pets are present in the building (e.g., microphones detecting a dog barking within the past 30 minutes, etc.);
iii. what is the location of people within the building (e.g., a sensor device worn by a person that reports its current location, etc.);
iv. which household systems are on (e.g., a system reports directly to the system controller, a sensor detecting the physical condition affected by a system, etc.);
v. which appliances are on (e.g., smart plug sensors detecting electrical current above a particular threshold, etc.);
vi. the location of people relative to the operating household systems and appliances (e.g., smart plug sensors detecting electrical current above a particular threshold and sensors detecting motion, etc.);
vii. the status of the electricity and/or fuel supply (e.g., natural gas, propane, heating oil, etc.) to the building;
viii. the temperatures inside and outside of the building;
ix. whether it is light or dark outside of the house.

In some embodiments of the present invention, but not all, system controller 202 also uses environmental information to generate the representation of the state of building 400. Environmental information includes, without limitation, one or more of the following:

i. the geo-location of building 400 or of a room/area with the building;
ii. the current time of day and/or other calendrical time information;
iii. one or more weather conditions;
iv. the calendars of one or more residents/occupants of building 400.

At operation 703, system controller 202 generates one or more decisions based on the representation of a state of building 400. By considering the state representation of building 400 generated above, system controller 202 develops context awareness, which the controller uses in conjunction with various "reasoning" algorithms that are known in the art, in order to generate the decisions and to orchestrate various activities throughout building 400. A generated decision can be used by one or more of actor devices 203-1 through 203-N, as described below, and can include one or more of the following, for example and without limitation:

i. turn one or more lights on or off;
ii. increase or decrease the temperature in a particular room or set of rooms;
iii. activate or deactivate a security alarm;
iv. open or close one or more doors, windows, and/or shades;
v. dispense a portion of pet food;
vi. turn one or more household systems on or off;
vii. turn one or more appliances on or off;
viii. send one or more messages to one or more recipients indicating the status of one or more systems of the building, including the fuel supply (e.g., natural gas, propane, heating oil, etc.).

In accordance with an illustrative embodiment of the present invention, system controller 202 receives and processes information from "dumb" sensor devices that do not process any information and merely report a state of the physical condition being monitored, such as a temperature sensor reporting the temperature it is sensing and so on. In some embodiments of the present invention, however, system controller 202 also accepts and processes signals transmitted by "smart" sensors. For example, in a Z-Wave™-based system, there are no dumb sensor devices; a Z-Wave™ thermostat device i) measures temperature and additionally, based on the thermostat's set point, ii) takes some action by transmitting a command. But the Z-Wave™ sensor device also transmits the raw temperature readings, in addition to the higher-level command.

Furthermore, based on the state representation of building 400 determined at operation 701, system controller 202 can i) merely use the raw data and ignore the transmitted higher-level set point data or command, ii) use only the set point/command, or iii) use both the raw data and the set point/command, depending on the conditional logic programmed. Controller 202 can select which level of information to use from a given sensor device, for updating the state representation of building 400, in performing one or more of the operations subsequently described, or both.

At operation 705, system controller 202 infers, or deduces, one or more activities or events at the building (i.e., inside and/or outside), based on one or more of i) the signals received from sensor devices 201-1 through 201-M, ii) one or more memorized states of at least one processing event, and iii) environmental information, in any combination thereof. The activities that can be inferred, as well as the sensor signals and/or states with which each activity is inferred, are as follows, for example and without limitation:

i. who is present. For example, John typically uses the garage door in the evening, and the motion sensor nearest the garage detects someone entering at 9 pm. Based on this information, with or without additional information, system controller 202 might infer that John is now present. As another example, a particular mobile station or other personal device that has been previously associated with John is detected (e.g., by detecting a MAC address of the device's WiFi and/or Bluetooth radio, etc.); from this, controller 202 might infer that John is present.

ii. who will be present in the future. For example, some privately shared information can be accessed (e.g., via the Internet), such as a) a pattern of movement of a particular vehicle through an Internet service such as Google Lattitude™ or Glympse™ (possibly tagged with the message "driving home with the kids") or b) even some more detailed information (e.g., the navigation computer in Jane's car has been set up to guide home and has calculated it will reach the home location in two hours). The information access can be in either "pull" (i.e., the controller 202 polls the info) or "push" (i.e., the computer in Jane's car notifies the home it is driving to). From this information, system controller 202 might infer that Jane will be home later.

iii. what people are doing. For example, the light sensor in the bathroom detects light, and water (or the flow of water) is detected in the bathtub. Based on this information, with or without additional information, system controller 202 might infer that someone is taking a bath.

iv. what people will be doing in the future. For example, it is sometime after 6 am on a workday and motion is detected in the master bedroom. Based on this information, with or without additional information, system controller 202 might infer that someone will be preparing to go to work.

v. which appliances will be used in the future. For example, it is sometime between 6 am and 8 am on a workday and motion is detected in the kitchen. Based on this information, with or without additional information, system controller 202 might infer that the coffee maker will be used.

vi. whether a system needs to be activated. For example, it is 7:30 am on a workday, the outside temperature is sensed as being −20° C., and motion is sensed as heading into the front hallway toward the door. Based on this information, with or without additional information, system controller 202 might infer that John's car should be remotely started.

The activity or activities inferred by system controller 202 can be human or non-human activities (i.e., activities in which a human does or does not participate in); the human activity can involve waking, eating, bathing, sleeping, and so on. In some situations, the inferring of the activity occurs independently of the current time of day and/or other environmental condition(s), while in other situations the inferring relies in part on knowing the time of day and/or other environmental condition(s) (e.g., for context purposes, etc.).

In accordance with an illustrative embodiment of the present invention, system controller 202 infers one or more activities as follows. First, controller 202 generates one or more predefined patterns of data that represent candidate activities. The predefined patterns (i.e., "candidate patterns") correspond to activities such as waking, eating, bathing, sleeping, and so on, without limitation. System controller 202 uses machine-learning techniques that are well known in the art to generate each candidate pattern. It will be clear to those having ordinary skill in the art, after reading the present disclosure, how to make and use alternative embodiments wherein other techniques generate the candidate patterns, or wherein a combination of machine learning and other techniques is used. The candidate patterns are generated when processing for system controller 202 is initialized, and they can be updated based in part on learning over time the patterns of one or more people living in, or otherwise occupying, building 400.

Second, controller 202 generates one or more occurring data patterns, based at least in part on the sensor signals received from the sensor devices and the memorized states of one or more processing events. The characteristics of the generated patterns can be based on various attributes surrounding the candidate activities being considered. The set of sensor data to be used in determining the one or more patterns can vary, in terms of time (e.g., the past 15 minutes, the last hour, etc.) and/or in terms of the sensor devices involved with respect to rooms (e.g., master bedroom and bathroom, the entire inside of the house, etc.) and/or in terms of the types of sensor devices involved (e.g., motion sensors only, motion sensors and light sensors, all sensors, etc.), for example and without limitation. Additional examples are provided below.

After the proper attributes, the set of sensor data to be used, and other relevant considerations are defined for a particular type of candidate activity or activities being considered, controller 202 uses machine-learning techniques that are well known in the art to generate each occurring data pattern. It will be clear to those having ordinary skill in the art, after reading the present disclosure, how to make and use alternative embodiments wherein other techniques generate the patterns, or wherein a combination of machine learning and other techniques is used.

Third, controller 202 measures how precisely each generated pattern of occurring data matches one or more of the predefined, candidate patterns. Controller 202 compares one pattern to another and evaluates a proper measure of preciseness between them, in well-known fashion.

Fourth, based on the preceding measures of preciseness, controller 202 determines a relationship, if any, as between each generated pattern and one or more activities and, as a result, infers one or more activities that are or are not occurring. For example, by considering the respective measures of preciseness between each generated pattern being evaluated and the candidate patterns that represent candidate activities, it might be inferred that a person in building 400 is, in all likelihood, i) preparing breakfast, while the same person is probably ii) reviewing a work presentation, but the same person is most likely iii) not doing the laundry (because it appears that a second person is).

As discussed above, the inferring can be based on various sensor data (e.g., current input signal values received, etc.) in the context of internal memorized states of one or more processing events. In some situations, for example, the inferring relies on one or more motion-detection sensor devices, wherein the signals received from the sensor devices and relied upon convey whether motion is detected or not in the proximity of the sensor device. The activity that is inferred can be based on tracking the frequency at which each sensor device detects motion and comparing a corresponding, generated pattern to one or more candidate patterns characterized by the frequency-related attribute. Illustratively, when motion is sensed in quick succession in certain rooms of the house in mid-afternoon, the inferred activity might be that children are playing; on the other hand, when motion is sensed in slow succession in those rooms at 10:00 pm, the activity inferred might be that adults are walking around.

Within the scope of inferring, system controller 202 is capable of deriving one or more events, which might reflect internal or virtual states of the controller. For example, controller 202 is capable of inferring internally a "nighttime" event as occurring. The nighttime event triggers many system-wide actions such as turning off devices, setting up the HVAC system to night mode, and so on. The nighttime event is generated internally based on higher order digital filters being applied to multiple sensor devices, usually motion-sensor devices, in the following manner. Controller 202 observes the frequency/patterns of motion sensor detections. If the detections slowly decrease to zero between 9:00 pm and 1:00 am, controller 202 decides that the residents have gone to sleep and generates the nighttime virtual event to switch building 400 into the night mode.

A similar procedure is executed in the morning. Slowly waking up, a resident starts tripping a motion sensor in the sleeping room, then gets out of bed, and walks to a bathroom, tripping more and more motion sensors. If the motion activity reaches a predetermined threshold, system controller 202 infers a "daytime" event as occurring, and various systems within building 400 "wake up": a coffeemaker brews coffee, lights switch from a calm/night mood to a morning/energetic mood, a radio tunes to a radio station, and so on.

The activity that is inferred can also be based on which of multiple ranges of times currently applies (e.g., 5:00 am to 8:00 am [waking hours], 11:00 am to 1:00 pm [lunch hours], 6:00 pm to 9:00 pm [dinner hours], 10:00 pm to 1:00 am [retiring hours]). For example, if there is motion detected in the kitchen at 7:00 am, then the activity inferred might be breakfast preparation; on the other hand, if there is motion detected in the kitchen at 1:00 am, then someone might be getting a glass of water.

The activity that is inferred can also be based on tracking the relative times at which i) the first sensor device detects motion in a first area of the building and ii) the second sensor device detects motion in a second area of the building. For example, if there is motion detected first in the bedroom, then bathroom, then the kitchen, the activity inferred might be preparing for the day ahead; on the other hand, if there is motion detected first in the living area, then kitchen, the activity inferred might be getting a snack to bring back into the living area.

The activity inferred can be something other than an activity occurring at a sensed position and time by a motion sensor in the particular room or area. For example, motion sensor devices have been traditionally associated with burglar alarm systems, and they detect that a burglar is breaking into a particular room and at a particular time. In contrast, system controller 202 can use the signals from motion sensor devices in other "automation domains", such as turning on a coffee maker in the kitchen at 7:30 am when motion is detected in the bedroom at 7:00 am, because the inferred activity is workday preparation.

In some embodiments of the present invention, system controller 202 infers one or more activities at the building that are not occurring, based on a combination of the signals received from sensor devices 201-1 through 201-M. For example, it is sometime between 6:00 am and 8:00 am on a workday and motion is detected in the kitchen in a home with a single resident. Based on this information in the example, with or without additional information, system controller 202 might infer that the bedroom will not be occupied in the future and might take appropriate action (e.g., turn down the heat in the bedroom, etc.).

At operation 707, system controller 202 anticipates one or more events that affect building 400, based on one or more of i) the signals received from sensor devices 201-1 through 201-M, ii) one or more memorized states of at least one processing event, and iii) environmental information, in any combination thereof. System controller 202 uses the signals received from a sensor source (e.g., physical sensor device, virtual sensor, etc.), in which the signals convey a prediction (e.g., forecast, etc.) of a future condition that is relevant to building 400. Such a source can be, for example and without limitation, a weather-forecasting web service, and such a future condition can be, for example and without limitation, future temperature, future air quality, future cloud cover, future precipitation, and so on.

In a particular example, system controller 202 executes a thermostatic algorithm that runs a heating system control, which is influenced by the predicted temperature received from the web-based "sensor." This is particularly advantageous if there is a long lag in building 400's heating system, in which an event such as an extreme change in weather should be anticipated for optimal HVAC control. Anticipating a future outside temperature can reduce energy consumption by timing the heating in an optimal manner. Conversely, without anticipating such events, the heating system might not operate when needed and might operate when no longer needed, possibly resulting in undesirable oscillations. In some embodiments of the present invention, controller 202 controls the heating system based on the current outside temperature as monitored by a sensor device outside of building 400, instead of or in addition to basing the control on the future outside temperature.

As those who are skilled in the art will appreciate, after reading this specification, system controller 202 can use any predicted state (e.g., future temperature, future air quality, future cloud cover, future precipitation, etc.) that is received from one or more sensor devices or sources (virtual or otherwise), in order to anticipate one or more events and, accordingly, to affect one or more actor devices. Furthermore, controller 202 can use i) one or more such sources of predictions with ii) one or more sensor devices that provide state information of current conditions, in any combination.

As those who are skilled in the art will appreciate, after reading this specification, system controller 202 can anticipate something by inferring that it will happen, in at least some instances.

At operation 709, system controller 202 selects at least one of a group of actor devices that includes i) an actor device configured to perform a first function (e.g., sounding a security alarm, etc.) and ii) an actor device configured to perform a second function (e.g., regulating air temperature, something unrelated to security, etc.). Controller 202 selects the actor device or devices based on one or more of i) the signals received from sensor devices 201-1 through 201-M, ii) one or more memorized states of at least one processing event, and iii) environmental information, in any combination thereof. In some embodiments, controller 202 selects the actor device or devices based on the representation of the state of the building determined at operation 701.

In some embodiments, system controller 202 can refrain from processing in a traditional way the signals received from a particular sensor device. For example, in an exercise room in building 400, the resident might want the room a little on the warm side when he starts exercising, but then will want the room to cool down after having exercising for several minutes. Motion sensors can detect activity in the room and controller 202 can instruct a heating system actor device to lower the temperature based on the sensors detecting exercise activity. More significantly, controller 202 is also refraining from instructing a security system actor device to sound an alarm. In some other embodiments, controller 202 might also be disregarding a higher-level signal being received from the motion sensor that conveys an instruction to sound an alarm, choosing only to use the raw motion detection data.

The foregoing example involving motion detection is related to the convergence of vertical services, in particular the convergence of a security alarm system and a heating system. There are several "automation domains" within a home such as heating, media control, presence, alarm systems, and so on. Traditionally, they have been separate systems, so when the residents of a home went on vacation, they needed to adjust individual systems (e.g., timers, etc.) separately. In accordance with the illustrative system controller, the separate subsystems converge into a single, multi-domain control system. Specifically regarding motion sensors, they have been traditionally associated with burglar alarm systems and, consequently, they are used only when the alarm system is armed. System controller 202, however, uses motion sensors for other automation domains, such as regulating the air temperature in a room and refraining from sounding a security alarm, as in the foregoing example.

At operation 711, system controller 202 generates one or more messages designated for one or more actor devices associated with building 400, wherein at least some of the messages generated are based on the results generated in one or more of the afore-described operations in FIG. 7.

Figure 8:
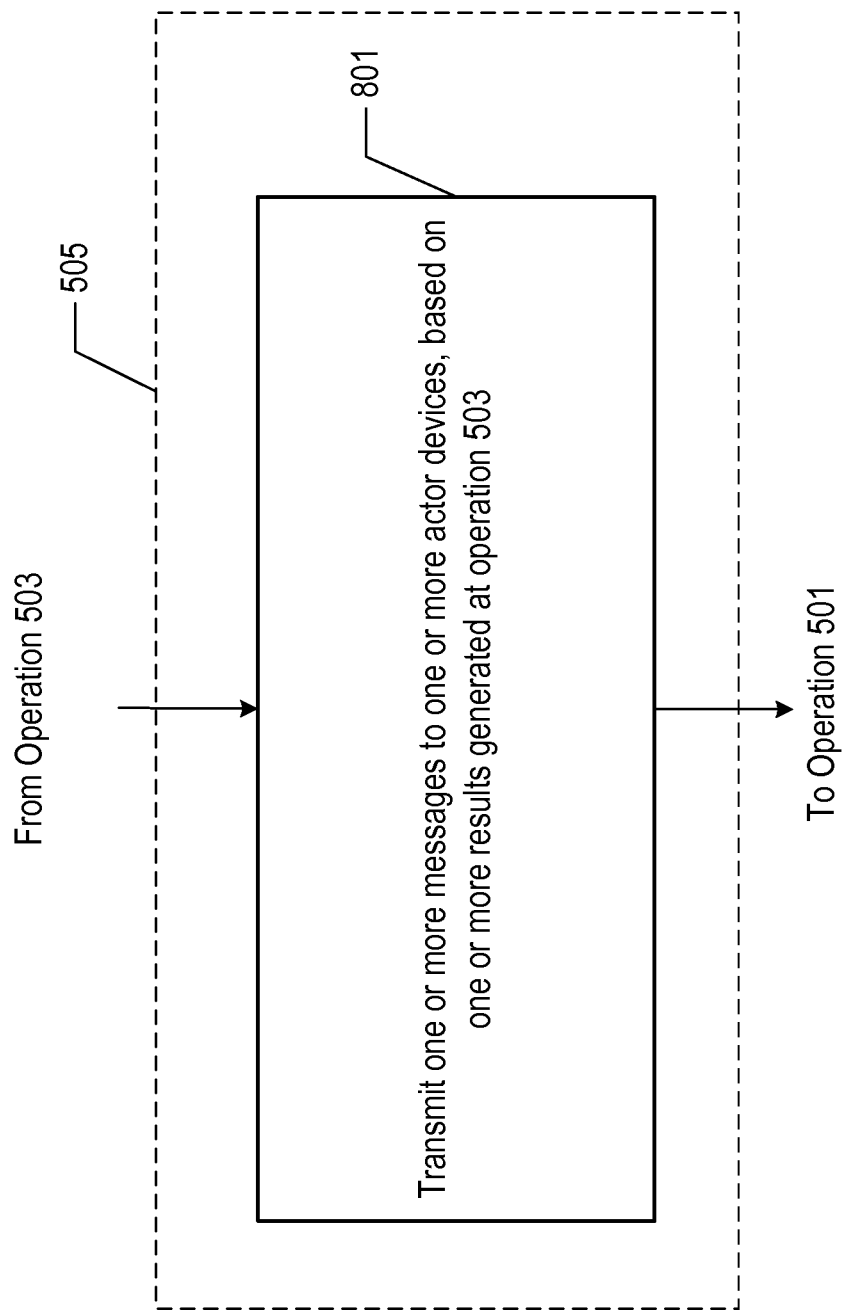
FIG. 8 depicts some salient sub-operations within operation 505.

FIG. 8 depicts some salient sub-operations within operation 505. At operation 801, system controller 202 transmits one or more messages, or signals that are based on the one or more messages, to one or more actor devices associated with building 400, based on one or more of the results generated at operation 503. The transmission can be based on one or more of the following, either individually or in any combination, without limitation:

i. the representation or representations of one or more building states, as generated at operation 701.
  ii. the one or more decisions generated at operation 703.
  iii. the one or more activities inferred at operation 705.
  iv. the one or more events anticipated at operation 707.

System controller 202 uses foregoing items listed, in order to determine the following, either individually or in any combination, without limitation:

i. whether to transmit at all.
  ii. which messages to transmit.
  iii. which actor devices are to get which messages.

At operation 801, control of execution returns to operation 501.

It is to be understood that the disclosure teaches just one set of examples of the illustrative embodiment and that many variations of the invention can easily be devised by those skilled in the art after reading this disclosure and that the scope of the present invention is to be determined by the following claims.

What is claimed is:

1. A method for controlling automation of a building comprising:
  receiving, by a system controller device, one or more signal values from each of a plurality of sensor devices associated with the building, including a surrounding environment thereof, wherein the plurality of sensor devices comprises at least a first sensor device, and wherein the received signal values comprise:
    a) a first input signal value received from the first sensor device, wherein the first input signal value of the first sensor device is of a first plurality of possible input signal values and is representative of raw data generated by the first sensor device in response to sensing a first physical condition, and
    b) a command received from the first sensor device;
  generating, by the system controller device, a state representation of the building based on a memorized state of at least one processing event;
  selecting, by the system controller device, one of:
    i) the first input signal value received from the first sensor device,
    ii) the command received from the first sensor device, and
    iii) both the first input signal value received from and the command received from the first sensor device,
  as decision information, based on the state representation of the building;
  generating, by the system controller device:
    a) a first decision, of a plurality of decisions, wherein the first decision is based on the selected decision information, and
    b) a first message designated for a first actor device associated with the building, wherein the first message is based on the first decision; and
  transmitting, by the system controller device, the first message to the first actor device.

2. The method of claim 1, further comprising:
  a) receiving, by the system controller device, a second input signal value from the first sensor device, wherein the second input signal value is of the first plurality of possible input signal values;
  b) generating, by the system controller device:
    i) a second decision, of the plurality of decisions, wherein the second decision is based on the second input signal value from the first sensor device, and
    ii) a second message designated for one of a plurality of actor devices that comprises the first actor device, wherein the second message is based on the second decision; and c) transmitting, by the system controller device, the second message to the one of a plurality of actor devices.

3. The method of claim 1 wherein the first actor device is one of a plurality of actor devices, and wherein the first message is selectively designated for the first actor device, rather than for a different actor device in the plurality of actor devices, the selection of the first actor device being based on the first decision.

4. The method of claim 1 further comprising providing a user interface for enabling a user to define an association between i) the first sensor device and ii) one of a plurality of actor devices that comprises the first actor device.

5. The method of claim 4 wherein, as a consequence of the defined association, a change in input signal value of the first sensor device causes the processor to generate a second decision that affects the associated actor device.

6. The method of claim 1, further comprising:
selecting, by the system controller device, one of i) an actor device configured to perform a first function and ii) an actor device configured to perform a second function, based on the first decision, resulting in a selected actor device; and
transmitting, by the system controller device, a second message to the selected actor device.

7. The method of claim 6 wherein the first sensor device is configured to detect motion, the first function comprises sounding a security alarm, and the second function is unrelated to security, and further comprising refraining from performing the first function based on the first decision.

8. The method of claim 1 wherein the memorized state of at least one processing event is based on a predetermined sequence of processing having occurred.

9. The method of claim 1 wherein the memorized state of at least one processing event is based on a predetermined processing event having occurred within a predetermined time interval.

10. The method of claim 1 wherein the first decision is further based on environmental information.

11. A building automation controller comprising:
a receiver configured to receive one or more signal values from each of a plurality of sensor devices associated with a building, including a surrounding environment thereof, wherein the plurality of sensor devices comprises at least a first sensor device, and wherein the received signal values comprise:
a) a first input signal value received from the first sensor device, wherein the first input signal value of the first sensor device is of a first plurality of possible input signal values and is representative of raw data generated by the first sensor device in response to sensing a first physical condition, and
b) a command received from the first sensor device;
a processor configured to:
a) generate a state representation of the building based on a memorized state of at least one processing event;
b) select one of:
i) the first input signal value received from the first sensor device,
ii) the command received from the first sensor device, and
iii) both the first input signal value received from and the command received from the first sensor device,
as decision information, based on the state representation of the building, and c) generate:
i) a first decision, of a plurality of decisions, wherein the first decision is based on the selected decision information, and
ii) a first message designated for a first actor device associated with the building, wherein the first message is based on the first decision; and
a transmitter configured to transmit the first message to the first actor device.

12. The controller of claim 11, wherein:
a) the receiver is further configured to receive a second input signal value from the first sensor device, wherein the second input signal value is of the first plurality of possible input signal values;
b) the processor is further configured to generate:
i) a second decision, of the plurality of decisions, wherein the second decision is based on the second input signal value from the first sensor device, and
ii) a second message designated for one of a plurality of actor devices that comprises the first actor device, wherein the second message is based on the second decision; and
c) the transmitter is further configured to generate the second message to the one of a plurality of actor devices.

13. The controller of claim 11 wherein the first actor device is one of a plurality of actor devices, and wherein the first message is selectively designated for the first actor device, rather than for a different actor device in the plurality of actor devices, the selection of the first actor device being based on the first decision.

14. The controller of claim 11 further comprising a user interface for enabling a user to define an association between i) the first sensor device and ii) one of a plurality of actor devices that comprises the first actor device.

15. The controller of claim 14 wherein, as a consequence of the defined association, a change in input signal value of the first sensor device causes the processor to generate a second decision that affects the associated actor device.

16. The controller of claim 11, wherein:
the processor is further configured to select one of i) an actor device configured to perform a first function and ii) an actor device configured to perform a second function, based on the first decision, resulting in a selected actor device; and
the transmitter is further configured to transmit a second message to the selected actor device.

17. The controller of claim 16 wherein the first sensor device is configured to detect motion, the first function comprises sounding a security alarm, and the second function is unrelated to security, and wherein the processor is further configured to refrain from performing the first function based on the first decision.

18. The controller of claim 11 wherein the memorized state of at least one processing event is based on a predetermined sequence of processing having occurred.

19. The controller of claim 11 wherein the memorized state of at least one processing event is based on a predetermined processing event having occurred within a predetermined time interval.

20. The controller of claim 11 wherein the first decision is further based on environmental information.

21. A building automation system comprising:
a first sensor device that is configured to monitor a first physical condition and to transmit wirelessly i) input signal values that are based on the first physical condition being monitored and ii) a command that is based on a predetermined set point, wherein the first sensor device is associated with a building, including a surrounding environment thereof; and a controller that is configured:
- a) to receive wirelessly i) the input signal values from the first sensor device, wherein the received input signal values comprise a input signal value received from the first sensor device, wherein the input signal value of the first sensor device is of a plurality of possible input signal values, and ii) the command from the first sensor device,
- b) to generate a state representation of the building based on a memorized state of at least one processing event;
- c) to select one of:
  - i) the first input signal value received from the first sensor device,
  - ii) the command received from the first sensor device, and
  - iii) both the first input signal value received from and the command received from the first sensor device, as decision information, based on the state representation of the building,
- d) to generate a first decision, of a plurality of decisions, wherein the first decision is based on the selected decision information, and
- e) to transmit a first message, wherein the first message is based on the first decision.

22. The system of claim 21, further comprising:
a second sensor device that is configured to monitor a second physical condition and to transmit wirelessly input signal values that are based on the second physical condition being monitored;
wherein the controller is further configured to receive wirelessly the input signal values from the second sensor device, wherein the received input signal values comprise a input signal value received from the second sensor device; and
wherein the first decision is further based on the input signal value from the second sensor device.

23. The system of claim 21 further comprising a first actor device that is configured to receive the first message, wherein the first actor device is one of a plurality of actor devices, and wherein the first message is selectively designated for the first actor device, rather than for a different actor device in the plurality of actor devices, the selection of the first actor device being based on the first decision.

24. The system of claim 23 further comprising a user interface for enabling a user to define an association between the first sensor device and the first actor device.

25. The system of claim 24 wherein, as a consequence of the defined association, a change in input signal value of the first sensor device causes the controller to generate a second decision that affects the first actor device.

26. The system of claim 21, wherein:
the controller is further configured to select one of i) an actor device configured to perform a first function and ii) an actor device configured to perform a second function, based on the first decision, resulting in a selected actor device; and
the controller is further configured to transmit a second message to the selected actor device.

27. The system of claim 26 wherein the first sensor device is further configured to detect motion, the first function comprises sounding a security alarm, and the second function is unrelated to security, and wherein the controller is further configured to refrain from performing the first function based on the first decision.

* * * * *